UNITED STATES PATENT OFFICE 2,501,977

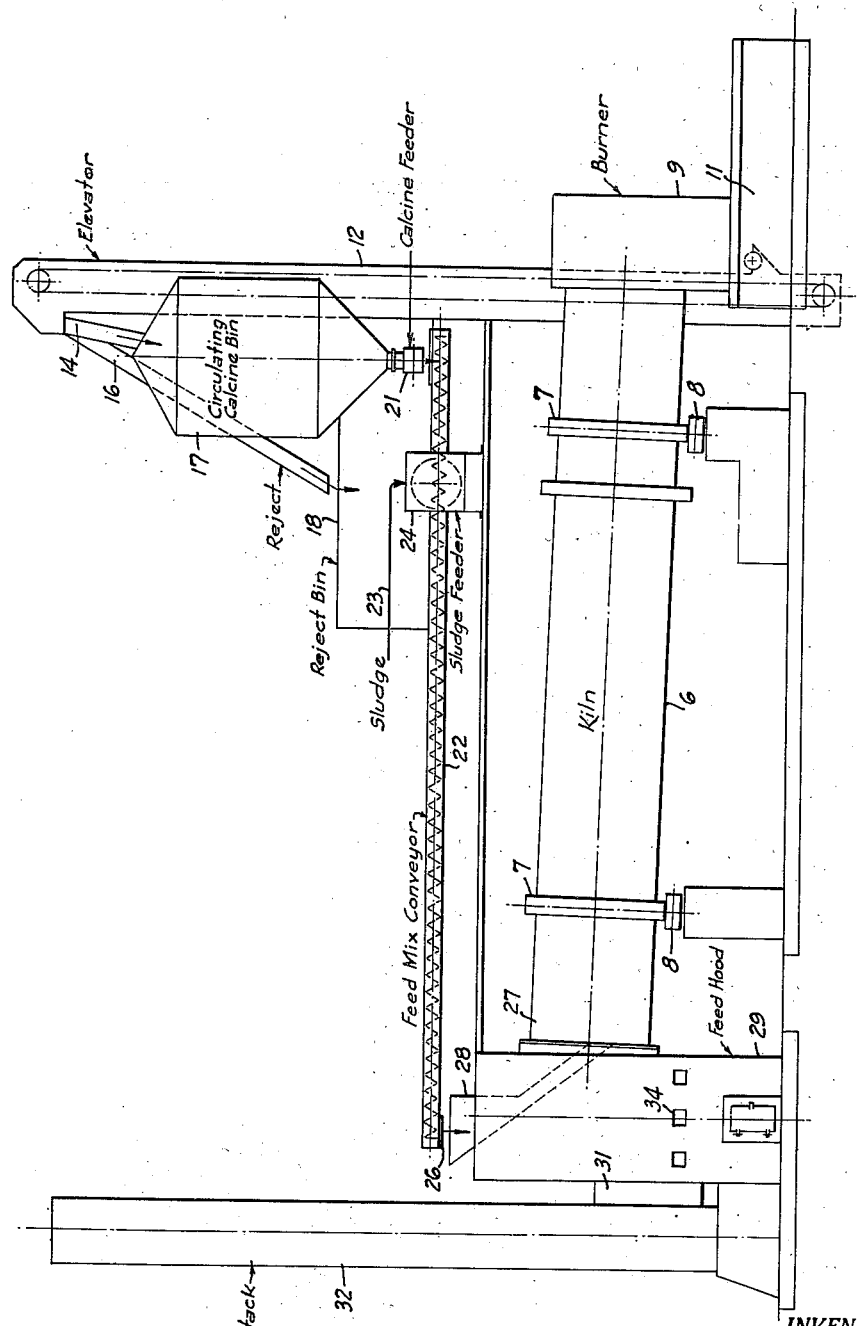

DECOMPOSING EMULSIFIED WASTE SLUDGES

Glenn A. Wallerstedt, Berkeley, and Mark Lintz, San Francisco, Calif.

Application February 11, 1946, Serial No. 646,738

3 Claims. (Cl. 110—7)

This invention relates to a process of incineration of oil refinery waste sludge and like waste materials.

A modern oil refinery of even moderate size will employ water for cooling and processing in a quantity of the order of 30,000 gallons per minute. Even though this water is clear, the small quantity of solids present, over a period of time, accumulate and finally provide a considerable volume of solids which must be disposed of as a waste material. Another source of solids in the waste water from an oil refinery is provided by decolorizing and processing clays and like materials which find their way into the waste sludge disposal system of the refinery.

The usual practice is to mix all waste water streams from the various refinery operations and subject these as a single stream to settling and like operations to the end that as much oil as can be removed is separated so that finally there results an oil-mud mixture for disposal. A typical composition for such a mixture is about 25% solids, 25% oil and the balance water, the whole being a very tight emulsion defying chemical and mechanical methods of emulsion breaking. This composition varies, of course, from refinery to refinery and from season to season, depending upon the particular operating conditions and other factors affecting the operations. In the main though, the waste sludge will have the composition indicated.

The disposal of this mud-oil mixture provides a serious problem. If the sludge is permitted to set in an open pond exposed to the atmosphere over a period of years, some water is lost by evaporation. This does not get rid of the oil or solids. The sludge cannot be discharged into rivers or other bodies of water because of the obvious nuisance. Generally the fuel value of the sludge is such that it is incapable of supporting combustion. If incineration of the oil-mud mixture alone is attempted, the application of heat results in the water and oil separating from the solid portion and running off as an emulsified stream. Various schemes of chemical treatment have been attempted without success.

We have discovered that if the solid content of the oil waste is increased until the oil-mud mixture is of the consistency of a thick paste-like mass, the oil ignites much sooner, the mass does not sputter and run under heat and, as ignition continues, the oil can be burned and the water evaporated to leave behind a solid residue. A portion of this residue can be utilized as the solid carrier to treat additional oil-mud mixture while any excess can be disposed of as fill. We have found that by adding from 10% to 45% of the weight of the oil-mud mixture in the form of discrete solid particles such as those previously derived by incineration of the mixture, the oil-mud can be suitably thickened and thereafter incinerated without any difficulty whatsoever. In place of using the porous solid particles which result from the incineration as the carrier, one can employ any other suitable solid material such as diatomaceous earth, previously calcined clay pellets, sand, coke fragments; in fact, one can employ any suitable solid so long as it is effective to thicken the sludge and disperse it so that, upon incineration, the heat quickly is available to all portions of the mass undergoing incineration, the water evaporated readily and the oil ignited. The size of the carrier is not critical but particles which are relatively fine (all coarser than 80 mesh and yet passing a ¼" screen) suffice.

It is the general broad object of the present invention to provide a novel process for the disposal of oil refinery and like waste sludges containing oil, solids and water.

The invention includes other objects and features of advantage, some of which, together with the foregoing, will appear hereinafter wherein a present preferred method of operation is disclosed.

Referring to the drawing which accompanies and forms a part hereof, the single figure is a side elevation, partly in section, illustrating a typical apparatus installation for practicing the invention.

Referring to the drawing, we have disclosed a rotary kiln 6 as a suitable incineration device, the kiln including rolls 7 adjacent each end to roll upon suitable supporting rollers 8. An oil burner 9 or other suitable heating device is positioned at the discharge end of the kiln. Solids discharged from the end of the kiln collect in a bin 11 from which they are removed by bucket elevator 12 for discharge into lines 14 and 16. Line 14 leads to a calcined solid bin 17, if the carrier is re-used, while line 16 leads to a reject bin 18. The solids are divided into two streams in such proportion that sufficient calcined solids are returned to ensure the proper volume of discrete carrier particles are returned for mixing with the sludge. If the carrier is not re-used, then only one line is necessary.

The solid discrete carrier particles, either derived from the process or from an external source, are fed from bin 17 through a feeding device 21 into a screw conveyor 22. A sludge stream is supplied through pipe line 23 into a sludge feeder 24 which discharges into the screw conveyor 22, the operation of the sludge feeder 24 and of the carrier feeder 21 being suitably coordinated to ensure that the sludge and carrier are fed in the proper ratio so that by the time the sludge-carrier mixture reaches outlet 26 at the end of the conveyor 22, the carrier and sludge are suitably mixed into an intimate and substantially homogeneous mixture.

The carrier and sludge mixture is admitted to the upper end 27 of kiln 6 through a feeder chute 28. The gases, fumes, products of combustion and water vapor from the kiln issue from the kiln into a feed hood 29 provided about the upper end of the kiln. The hood is connected by a conduit 31 to a stack 32. If desired, to ensure complete combustion and an absence of objectionable fumes from the stack, several auxiliary air inlets 34 can be utilized. The gases from the kiln can be passed through a waste heat boiler or other heat recovery device if desired.

The kiln is usually operated at such a temperature that the carrier issuing from the end of the kiln is dry and is free of water and any excess oil. If the kiln is operated with sufficient air and if a temperature between 1200° to 1500° F, is maintained adjacent the outlet end of the kiln, this will be attained. In any case the temperature should be such that the carrier, as it issues is a dry, free running solid. The carrier can be cooled by suitable means but generally its removal and traverse by the elevator to the circulating bin 17 suffices to provide sufficient heat loss. The carrier does not have to be cooled to atmospheric temperature before mixing with the sludge and the carrier can be at an elevated temperature so long as this is not sufficient to provide any particular fume problem during the mixing of the hot carrier with the sludge.

As a typical operation, sludge and a suitable carrier were mixed in such proportion that one-fourth of the weight of the sludge was added in the form of carrier particles previously derived from the process, the mixture being fed through the feed conveyor 22 and into the hot kiln. In the kiln, the water evaporated rapidly and, as the mass of carrier advanced through the kiln, the oil vaporized and ignited until finally, as the carrier issued from the kiln, it was free of water and substantially oil free and at a temperature of about 1200° F. The carrier was then removed and a portion of it was returned for further mixing while a portion of it was discharged as surplus. The discharged surplus carrier can, of course, be readily disposed of in various ways for it is a dry calcined solid useful for various purposes.

The tumbling action of the kiln maintains the mass in intimate contact with the combustion products passing through the kiln and, at the same time, rolling the carrier particle into globular, discrete particles. In place of a kiln one can use a Herreshoff furnace or a Mannheim furnace; direct heating of the carrier-sludge mass is preferred since in this way the oil can be consumed and so removed. If the carrier-sludge mass is heated indirectly, the carrier will contain residual oil and carbon.

Many sludges which may be treated advantageously by the process of the present invention contain more oil than is required to evaporate the water present. Also, the oil present can include both light and heavy fractions. One should, in operating a plant embodying the present invention, keep these facts in mind to the end that an oil vapor, fume or smoke nuisance is not created. The installation described heretofore provides adequate combustion volume ensuring that the oil present is consumed so that both fume and smoke nuisance are avoided.

We claim:

1. A process for incinerating a waste oil sludge containing oil, water and non-combustible solids, the process comprising mixing the sludge with from about 10% to about 45% of discrete carrier particles of a size between about 4 mesh and about 80 mesh, and subjecting said mixture to incineration to evaporate the water present in the sludge and consume a substantial portion of the combustible sludge constituents present.

2. A process for incinerating a waste oil sludge containing oil, water and non-combustible solids, the process comprising mixing the sludge with from 10% to 45% of a carrier having a particle size between about 4 mesh and about 80 mesh thereafter subjecting the mixture to incineration to evaporate the water present in the sludge and consume a substantial portion of the combustible sludge constituents present in the sludge and leave, as a residue, discrete solid particles, and returning at least some of said residual particles for mixing with additional sludge as the carrier therefor.

3. A process for incinerating a waste oil sludge containing oil, water and non-combustible solids, the process comprising mixing the sludge with from about 10% to about 45% of a carrier having a particle size between about 4 mesh and about 80 mesh and subjecting said mixture to agitation and incineration in said combustion zone to evaporate the water present in the sludge and consume a substantial portion of the combustible sludge constituents present in the sludge to leave, as a residue, discrete solid particles, and returning at least some of said residual particles for mixing with additional sludge as the carrier therefor.

GLENN A. WALLERSTEDT.
MARK LINTZ.

REFERENCES CITED

The following references are of record in the file of this patent:

UNITED STATES PATENTS

| Number | Name | Date |
|---|---|---|
| 1,660,434 | Cory | Feb. 28, 1928 |
| 1,818,901 | Mallery | Aug. 11, 1931 |
| 1,972,454 | Manley | Sept. 4, 1934 |
| 1,974,698 | Van Loener | Sept. 25, 1934 |
| 1,976,528 | Vanderveer | Oct. 9, 1934 |
| 1,987,870 | Robinson | Jan. 15, 1935 |
| 2,033,010 | Russell | Mar. 3, 1936 |
| 2,042,058 | Jefferson | May 26, 1936 |
| 2,046,756 | Thomas | July 7, 1936 |
| 2,102,427 | Lloyd | Dec. 14, 1937 |
| 2,258,438 | Barton | Oct. 7, 1941 |
| 2,430,182 | McGuire et al. | Nov. 4, 1947 |